United States Patent
Sun et al.

(10) Patent No.: US 11,134,027 B2
(45) Date of Patent: Sep. 28, 2021

(54) METHOD AND APPARATUS FOR TRANSMITTING UPSTREAM DATA IN A CABLE NETWORK

(71) Applicant: Huawei Technologies Co., Ltd., Shenzhen (CN)

(72) Inventors: Yanbin Sun, Shenzhen (CN); Chenghu Shen, Shenzhen (CN); James Jeng Chen, Corona, CA (US); Tao Ouyang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/714,423

(22) Filed: Dec. 13, 2019

(65) Prior Publication Data

US 2020/0120041 A1    Apr. 16, 2020

Related U.S. Application Data

(63) Continuation of application No. PCT/US2018/037897, filed on Jun. 15, 2018.

(60) Provisional application No. 62/519,987, filed on Jun. 15, 2017.

(51) Int. Cl.
*H04L 12/927* (2013.01)
*H04L 12/28* (2006.01)

(52) U.S. Cl.
CPC .......... *H04L 47/80* (2013.01); *H04L 12/2801* (2013.01)

(58) Field of Classification Search
CPC ............................. H04L 12/2801; H04L 47/80
See application file for complete search history.

(56) References Cited

U.S. PATENT DOCUMENTS

| | | | | |
|---|---|---|---|---|
| 6,442,158 | B1 * | 8/2002 | Beser | H04L 12/2801 370/352 |
| 7,164,697 | B1 * | 1/2007 | Beser | H04L 12/2801 370/485 |
| 7,230,909 | B1 | 6/2007 | Raissinia et al. | |
| 7,443,873 | B1 * | 10/2008 | Beser | H04N 7/17309 348/E7.07 |
| 2001/0055319 | A1 * | 12/2001 | Quigley | H04L 12/2801 370/480 |
| 2002/0073432 | A1 * | 6/2002 | Kolze | H04L 12/2801 725/111 |
| 2003/0142690 | A1 | 7/2003 | Beser | |
| 2006/0271986 | A1 * | 11/2006 | Vogel | H04N 7/173 725/111 |
| 2009/0103557 | A1 * | 4/2009 | Hong | H04L 12/2801 370/431 |

(Continued)

FOREIGN PATENT DOCUMENTS

| | | |
|---|---|---|
| EP | 3322246 A1 | 8/2015 |
| WO | 2017020235 A1 | 2/2017 |

*Primary Examiner* — Stephen J Clawson
(74) *Attorney, Agent, or Firm* — Conley Rose, P.C.

(57) ABSTRACT

A method for transmitting upstream data in a cable network is provided. The method includes a cable modem (CM) receiving a generic service identifier (G-SID) included in a corresponding information element (IE) in a data over cable service interface specification (DOCSIS) upstream bandwidth allocation MAP message. The G-SID is a unique identifier assigned to the CM. The method includes the CM transmitting the upstream data for one or more service flows of the CM via at least a portion of the CM bandwidth allocation.

16 Claims, 12 Drawing Sheets

(56) References Cited

U.S. PATENT DOCUMENTS

2010/0061234 A1 3/2010 Pai et al.
2017/0346740 A1* 11/2017 Brewer .................. H04L 47/15

* cited by examiner

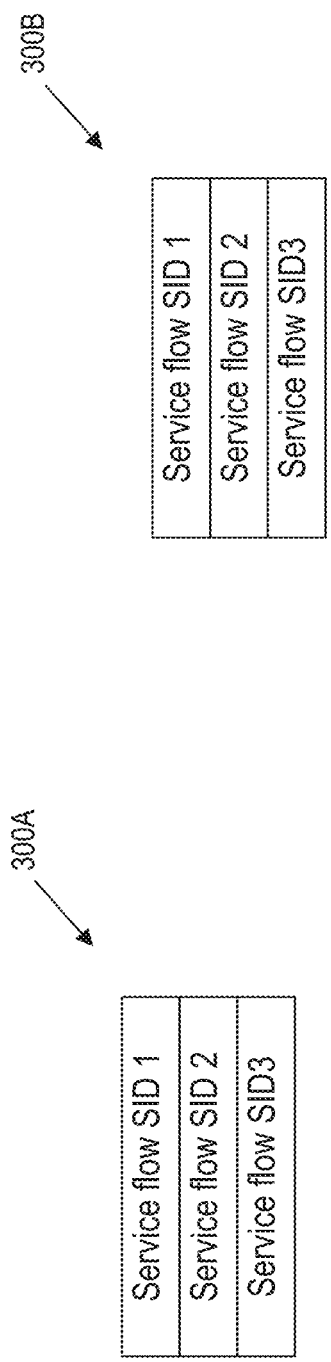

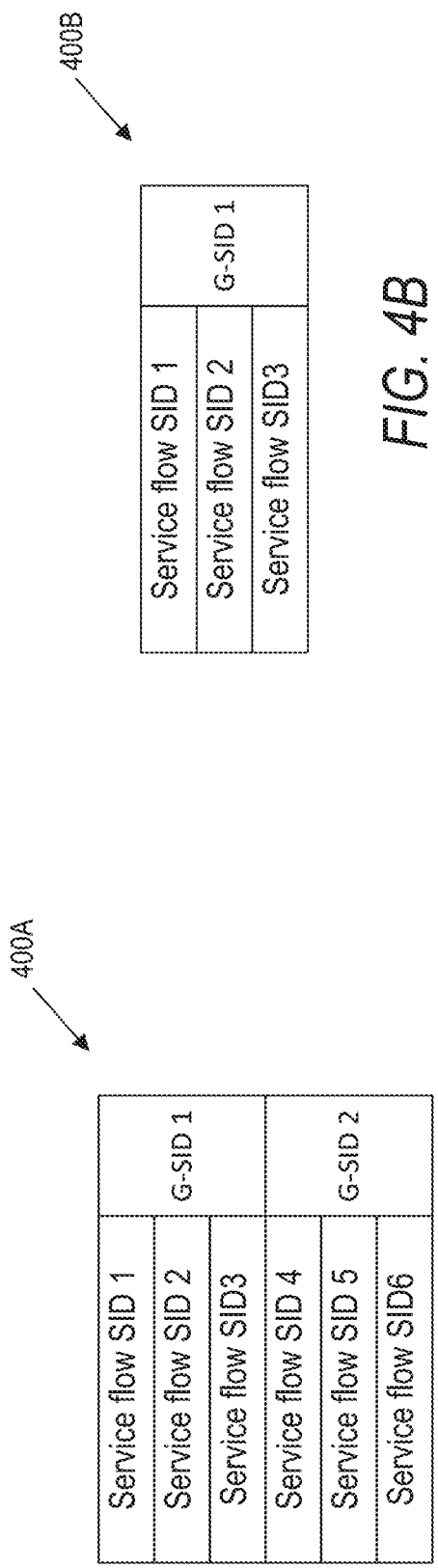

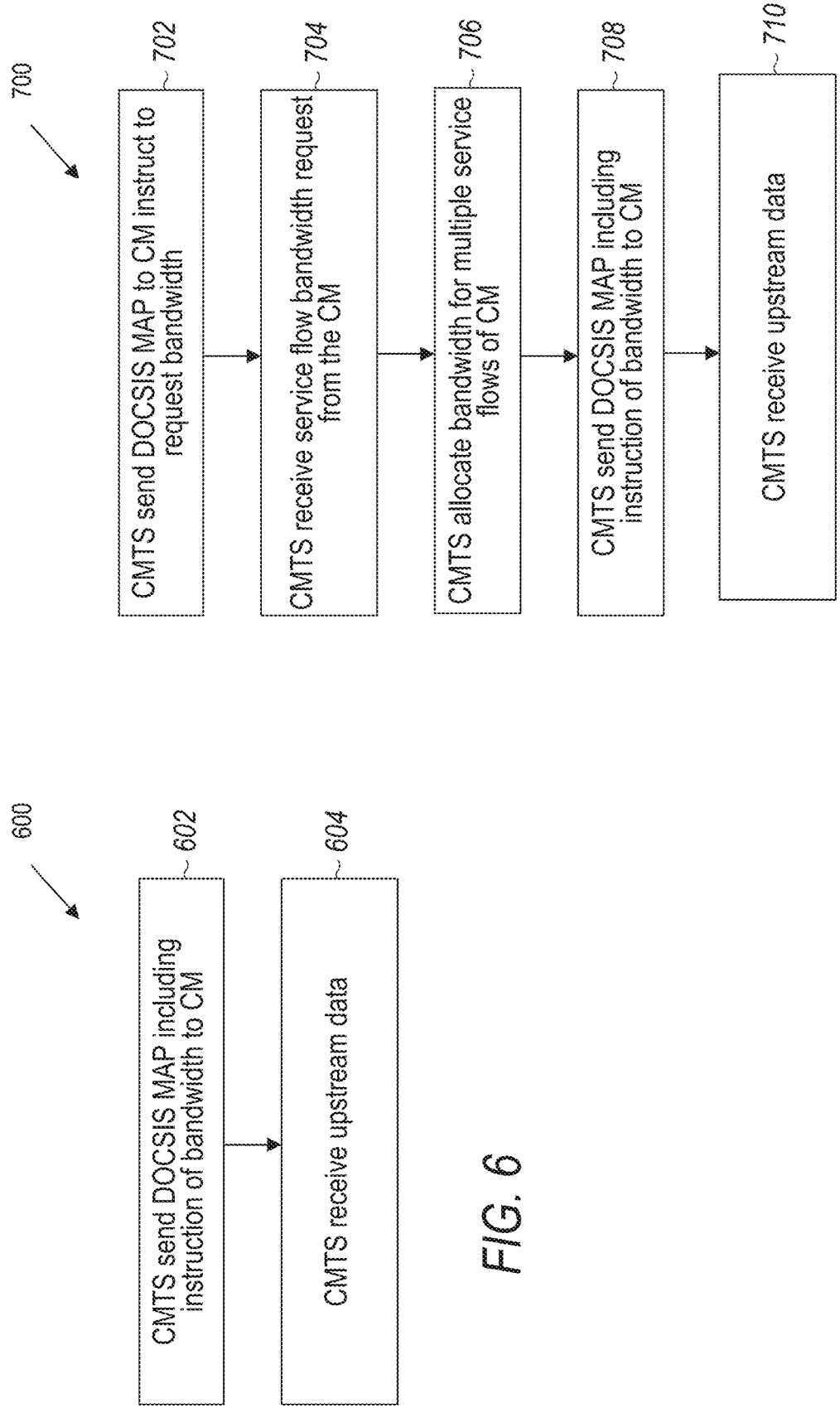

METHOD AND APPARATUS FOR TRANSMITTING UPSTREAM DATA IN A CABLE NETWORK

CROSS-REFERENCE TO RELATED APPLICATIONS

The present application is a continuation of International Application No. PCT/US2018/037897 filed Jun. 15, 2018, by Huawei Technologies Co., Ltd., and titled "Method and Apparatus for Transmitting Upstream Data in a Cable Network," which claims priority to U.S. Provisional Patent Application No. 62/519,987 filed Jun. 15, 2017, by Yanbin Sun, et al., and titled "Contention Requests in Full Duplex (FDX) Data Over Cable Service Interface Specification (DOCSIS)," each of which is incorporated herein by reference.

TECHNICAL FIELD

The disclosure is related to transmitting upstream data in a DOCSIS communication system, and more particularly, to upstream bandwidth allocation.

BACKGROUND

A data over cable service interface specification (DOCSIS) is a communication protocol used in cable networks to enable a headend cable mode termination system (CMTS) and customer premises equipment (CPE) including a cable modem (CM) to communicate with each other over the Internet and over a traditional cable plant. DOCSIS 3.1 uses orthogonal frequency division with multiple access (OFDMA) for upstream transmissions from the CM to the CMTS and orthogonal frequency division multiplex (OFDM) for downstream transmission from the CMTS to the CM where upstream and downstream channels are allocated differently in the radio frequency (RF) communication spectrum. In OFDMA upstream transmission, a given CM looks for its time/frequency transmission allocation as is defined in a DOCSIS MAP sent from the CMTS to the CM. The DOCSIS MAP message defines the time/frequency of the CM's upstream transmission opportunities.

SUMMARY

In one embodiment, the disclosure includes a method, system, and apparatus for transmitting upstream data in a cable network and according to a DOCSIS (Data Over Cable Service Interface) Specification as shown and described.

A first aspect of example embodiment includes a method for transmitting upstream data in a cable network is provided in an example, comprising a cable modem (CM) receiving a generic service identifier (G-SID) included in a corresponding information element (IE) in a data over cable service interface specification (DOCSIS) upstream bandwidth allocation MAP message, with the G-SID comprising an identifier assigned to the CM, with the IE including the G-SID and a CM bandwidth allocation for multiple service flows of the CM; and the CM transmitting the upstream data for one or more service flows of the CM via at least a portion of the CM bandwidth allocation.

In any of the preceding method of examples, the IE includes the CM bandwidth allocation for a service flow of the CM.

In any of the preceding method examples, the IE includes the CM bandwidth allocation for multiple service flows of the CM.

In any of the preceding method examples, the IE includes the CM bandwidth allocation for multiple service flows of the CM and wherein the CM distributes the CM bandwidth allocation among the multiple service flows.

In any of the preceding method examples, the IE includes the CM bandwidth allocation for multiple service flows of the CM in a single entry of the upstream bandwidth allocation MAP message.

In any of the preceding method examples, the IE includes the CM bandwidth allocation for multiple service flows of the CM in a single entry of the upstream bandwidth allocation map (MAP) message, and wherein the CM bandwidth allocation for the multiple service flows is identified by the G-SID.

In any of the preceding method examples, the method further comprises the initial steps of the CM receiving an informational DOCSIS MAP message, with the informational DOCSIS MAP message including the G-SID and a request bandwidth allocation for requesting CM bandwidth, with the request bandwidth allocation comprising a bandwidth for allocation requests transmitted by the CM; and the CM requesting a bandwidth allocation for one or more service flows of the CM.

In any of the preceding method examples, the method further comprises the CM sending a single service flow bandwidth request for requesting the bandwidth for the single service flow via a time slot instructed by the information DOCSIS message comprising the G-SID, with the single service flow request comprising a SID of the single service flow.

In any of the preceding method examples, the method further comprises the CM sending a multiple service flows bandwidth request for requesting the bandwidth for the multiple service flows via a time slot instructed by the second DOCSIS message, with the multiple service flows bandwidth request comprising the G-SID.

In any of the preceding method examples, the method further comprises the CM determining, from the multiple service flows, that at least two service flows need bandwidth allocation for transmitting service data.

In any of the preceding method examples, the multiple service flows bandwidth request further comprises at least two SIDs corresponding to the at least two service data flows.

In any of the preceding method examples, the IE includes the CM bandwidth allocation for multiple service flows of the CM in a single entry of the upstream bandwidth allocation map (MAP) message.

In any of the preceding method examples, the CM bandwidth allocation for the multiple service flows is identified by the G-SID.

A second aspect of example embodiment includes a cable modem (CM) comprising a memory storage comprising instructions; and one or more processors in communication with the memory. The one or more processors execute the instructions to receive a generic service identifier (G-SID) included in a corresponding information element (IE) in a data over cable service interface specification (DOCSIS) upstream bandwidth allocation MAP message, with the G-SID comprising an identifier assigned to the CM, with the IE including the G-SID and a CM bandwidth allocation for multiple service flows of the CM; and transmit the upstream data for one or more service flows of the CM via at least a portion of the CM bandwidth allocation.

In any of the preceding CM examples, the IE includes the CM bandwidth allocation for a service flow of the CM.

In any of the preceding CM examples, the IE includes the CM bandwidth allocation for multiple service flows of the CM.

In any of the preceding CM examples, the IE includes the CM bandwidth allocation for multiple service flows of the CM and wherein the CM distributes the CM bandwidth allocation among the multiple service flows.

In any of the preceding CM examples, the IE includes the CM bandwidth allocation for multiple service flows of the CM in a single entry of the upstream bandwidth allocation MAP message.

In any of the preceding CM examples, the IE includes the CM bandwidth allocation for multiple service flows of the CM in a single entry of the upstream bandwidth allocation map (MAP) message, and wherein the CM bandwidth allocation for the multiple service flows is identified by the G-SID.

In any of the preceding CM examples, the one or more processors further execute the instructions to receive an informational DOCSIS MAP message, with the informational DOCSIS MAP message including the G-SID along with a request bandwidth allocation for requesting CM bandwidth, with the request bandwidth allocation comprising a bandwidth for allocation requests transmitted by the CM; and request a bandwidth allocation for one or more service flows of the CM.

A third aspect of example embodiment includes a method for transmitting upstream data in a cable network, comprising: sending, by a cable modem termination system (CMTS), a data over cable service interface specification (DOCSIS) upstream bandwidth allocation MAP message to a cable modem (CM), the DOCSIS upstream bandwidth allocation MAP message including a generic service identifier (G-SID) in a corresponding information element (IE), the G-SID comprising an identifier assigned to the CM, the IE including a CM bandwidth allocation; and receiving, by the CMTS, upstream data for one or more service flows of the CM via at least a portion of the CM bandwidth allocation.

In any of the preceding method examples, the IE includes the CM bandwidth allocation for a service flow of the CM.

In any of the preceding method examples, the IE includes the CM bandwidth allocation for multiple service flows of the CM.

In any of the preceding method examples, the IE includes the CM bandwidth allocation for multiple service flows of the CM in a single entry of the upstream bandwidth allocation MAP message.

In any of the preceding method examples, the IE includes the CM bandwidth allocation for multiple service flows of the CM in a single entry of the upstream bandwidth allocation map (MAP) message, and wherein the CM bandwidth allocation for the multiple service flows is identified by the G-SID.

In any of the preceding method examples, the method further comprises the initial steps of the CMTS transmitting an informational DOCSIS MAP message to the CM, with the informational DOCSIS MAP message including the G-SID along with a request bandwidth allocation for requesting CM bandwidth, with the request bandwidth allocation comprising a bandwidth for allocation requests transmitted by the CM; and the CMTS receiving a bandwidth allocation for one or more service flows from the CM.

A fourth aspect of example embodiment includes a cable modem termination system (CMTS) is provided in an example, comprising a memory storage comprising instructions; and one or more processors in communication with the memory. The one or more processors execute the instructions to send a data over cable service interface specification (DOCSIS) upstream bandwidth allocation MAP message to a cable modem (CM), with the DOCSIS upstream bandwidth allocation MAP message including a generic service identifier (G-SID) in a corresponding information element (IE), the G-SID comprising an identifier assigned to the CM, with the IE including the G-SID and a CM bandwidth allocation for multiple service flows of the CM; and receive the upstream data for one or more service flows of the CM via at least a portion of the CM bandwidth allocation.

In any of the preceding CMTS examples, the IE includes the CM bandwidth allocation for a service flow of the CM.

In any of the preceding CMTS examples, the IE includes the CM bandwidth allocation for multiple service flows of the CM.

In any of the preceding CMTS examples, the IE includes the CM bandwidth allocation for multiple service flows of the CM in a single entry of the upstream bandwidth allocation MAP message.

In any of the preceding CMTS examples, the IE includes the CM bandwidth allocation for multiple service flows of the CM in a single entry of the upstream bandwidth allocation map (MAP) message, and wherein the CM bandwidth allocation for the multiple service flows is identified by the G-SID.

In any of the preceding CMTS examples, the one or more processors further execute the instructions to transmit an informational DOCSIS MAP message to the CM, with the informational DOCSIS MAP message including the G-SID along with a request bandwidth allocation for requesting CM bandwidth, with the request bandwidth allocation comprising a bandwidth for allocation requests transmitted by the CM; and receive a bandwidth allocation for one or more service flows from the CM.

A fifth aspect of example embodiment includes a cable modem (CM) provided in an example. The CM in this example includes functional modules that implement features of the CM, and the functions may be realized by hardware, by software, or by a combination of hardware and software.

A sixth aspect of example embodiment includes a cable modem termination system (CMTS) provided in an example. The CMTS in this example includes functional modules that implement features of the CMTS, and the functions may be realized by hardware, by software, or by a combination of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3A illustrates a table of service flows stored in the CM in an embodiment.

FIG. 3B illustrates the service IDs of service flows of the CM stored in the CMTS in an embodiment.

FIG. 3C illustrates entries of the DOCSIS MAP received by the CM in an embodiment.

FIG. 4A illustrates a mapping between service flow identifiers and G-SID for each of a plurality of CMs 250 in an embodiment.

FIG. 4B illustrates the mapping between the G-SID and the service IDs of the multiple service flows stored in the CM a 250.

FIG. 4C illustrates entries of the DOCSIS MAP received by the CM 250 in an embodiment.

FIG. 6 illustrates a flow chart of a method for transmitting upstream data in the CM 250 in an embodiment.

FIG. 7 illustrates a flow chart of a method for transmitting upstream data in the CM 250 in an embodiment.

DETAILED DESCRIPTION

Figure 1:
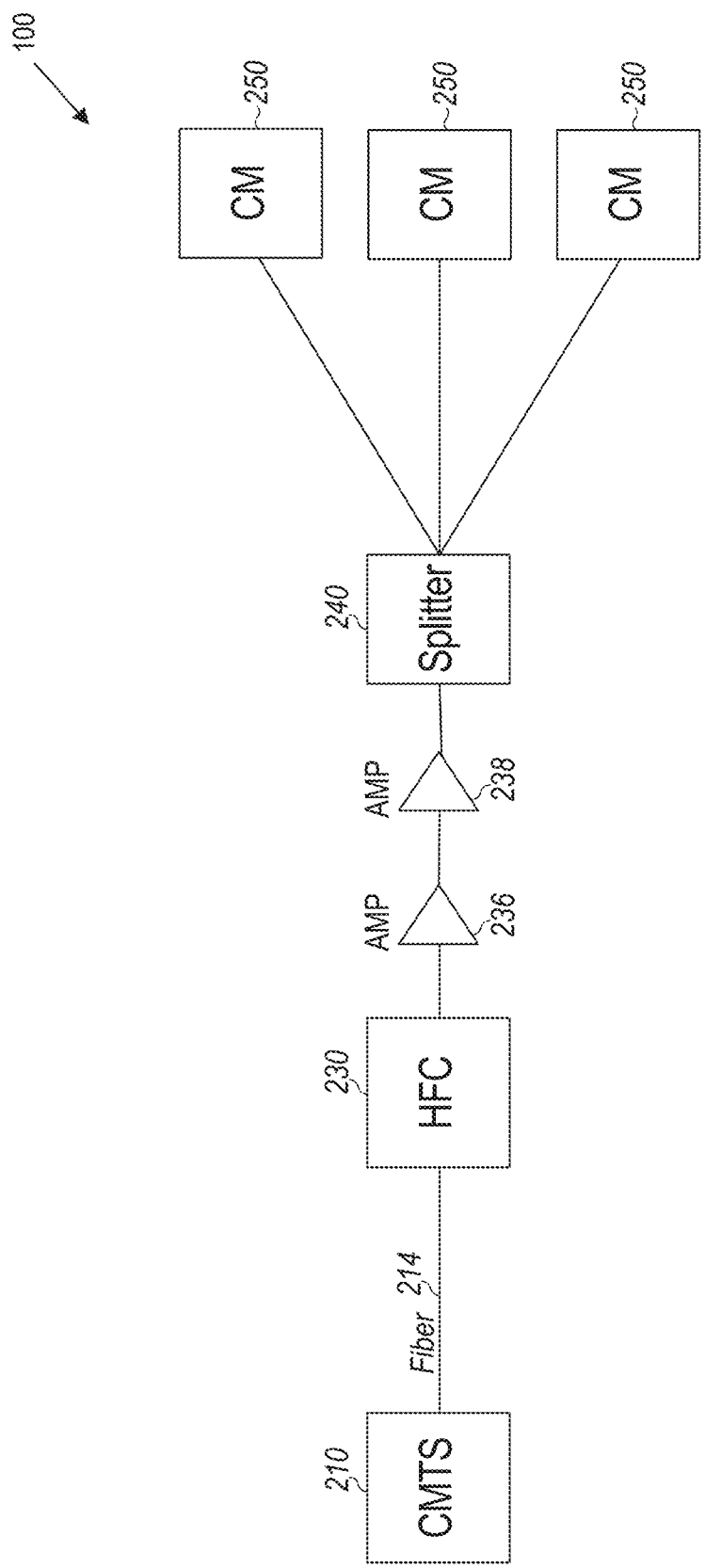
FIG. 1 is a schematic diagram of an embodiment of a DOCSIS network in an embodiment.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
BE: best effort
CM: cable modem
CMTS: cable modem termination system
CPU: central processing unit
DOCSIS: Data Over Cable Service Interface Specification
DS: downstream
DSP: digital signal processor
EO: electrical-to-optical
FDX: full duplex
FPGA: field-programmable gate array
G-SID: generic SID
HFC: hybrid fiber-coaxial
IE: information element
MAP: upstream bandwidth allocation map
Mb/s: megabit(s) per second
MHz: megahertz
ms: millisecond(s)
nrtPS: non-real-time polling service
OE: optical-to-electrical
RAM: random-access memory
ROM: read-only memory
RX: receiver unit
SID: service identifier
SRAM: static RAM
STB: set-top box
TCAM: ternary content-addressable memory
TX: transmitter unit
US: upstream
64-QAM: 64-point quadrature amplitude modulation.

A cable modem termination system (CMTS) allocates bandwidth for one or more upstream channels, for upstream transmissions from a CM to the CMTS. Bandwidth allocated to one cable modem (CM) may be allocated across multiple channels upon which the CM can transmit. An upstream channel is modeled as a stream of mini-slots. The CMTS generates the time reference for identifying these slots (or mini-slots). The CMTS also controls access to these slots by the cable modems. For example, the CMTS may grant some number of contiguous slots to a CM for transmitting a data protocol data unit (PDU). The CM times its transmission so that the CMTS receives the CM's transmission in the time reference specified. The elements of the protocol used in requesting, granting, and using upstream bandwidth are described herein. The basic mechanism for assigning bandwidth management is the allocation map (MAP).

The data over cable service interface specification (DOCSIS) allocation MAP message is a media access control (MAC) management message which is transmitted by the CMTS on the downstream channel and which describes, for some interval, the uses of the upstream mini-slots. A given MAP may describe some slots as grants in which particular CMs may transmit data, other slots as available for contention transmission, or transmit request of the CMs for requesting the bandwidth of the service flow of the CMs, and other slots as an opportunity for new CMs to join the link. The CMTS transmits allocation MAP/P-MAP PDUs on the downstream channel defining the allowed usage of all mini-slots. Many different scheduling algorithms may be implemented in the CMTS by different vendors. This embodiment describes the protocol elements by which bandwidth is requested and granted.

The CMTS transmits allocation MAP PDUs on the downstream channel to a CM or CMs, with the MAP PDUs defining the allowed usage of all mini-slots. Mini-slot regions that are not allocated to any transmit opportunities are described by an information element (IE) in the MAP assigned to the null service identifier (NULL SID), which is (0x0000). Each IE consists of a 14-bit Service Identifier (SID), a 4-bit type code (e.g., an Interval Usage Code (IUC)), and a 14-bit starting offset. Because all CMs scan all IEs, it is preferable that IEs be short and of a relatively fixed format. IEs within the MAP are ordered by starting offset. For many purposes, the duration described by the IE is inferred by the difference between a starting offset of a particular IE and that of the following IE.

A service flow is used by Cable Multiple system operators (MSOs) to support different level of QoS traffic, such as a voice service, a data service, a video service and so on. The CM will be provisioned with a different Service Flow ID or service identifier (SID) for different services enabled in the CM. A Low Latency DOCSIS (LLD) can improve performance for time sensitive applications or 5G backhaul transmissions.

The service identifier or service flow identifier (SID) identifies the service flow and is assigned by the CMTS to an active or admitted upstream service flow. A CM is not allowed to transmit on an upstream channel without a valid upstream bandwidth allocation provided by the DOCSIS MAP (or P-MAP). If a MAP is missed due to error, the CM is not allowed to transmit on the corresponding channel for the period covered by the MAP.

FIG. 1 is a schematic diagram of an embodiment of a DOCSIS network 100. The DOCSIS network 100 may be a DOCSIS 3.1 network as specified in DOCSIS 3.1, Physical Layer Specification, Dec. 10, 2015, or DOCSIS MAC and Upper Layer Protocols Interface Specification, Dec. 10, 2015 ("DOCSIS MULPI"), which are incorporated by reference. The DOCSIS network 100 comprises a CMTS (cable modem termination system) 210, an HFC (hybrid fiber-coaxial) node 230 coupled to the CMTS 210 via an optical fiber 214, multiple cable modems (CMs) 250 and an STB coupled to the HFC node 230 via electrical cables, amplifiers 236 and 238, and a splitter 240. The three CMs 250 depicted in FIG. 1 may be individually referred to herein as CM a 250, CM b 250, and CM c 250. While three of the CMs 250 are illustrated in FIG. 1, more or fewer of the CMs 250 may be included in the DOCSIS network 100 in practical applications.

The CMTS 210 allocates bandwidth for one or more upstream service flows of each CM 250. The bandwidth allocated to the CM 250 may be allocated across multiple channels upon which the CM 250 can transmit. An upstream channel is modeled as a stream of mini-slots. The CMTS 210 generates the time reference for identifying these slots. The time reference identifying these slots is identified by an offset of the MAP. The CMTS 210 also controls access to these slots by the CMs 250. For example, the CMTS 210 may grant some number of contiguous slots to a CM 250 for it to transmit a data protocol data unit (PDU). The CM 250 times its transmission so that the CMTS 210 receives the CM's transmission in the time reference specified. The elements of the protocol used in requesting, granting, and using upstream bandwidth are described herein. The basic mechanism for assigning bandwidth management is the allocation map (MAP).

The CMTS 210 transmits the upstream bandwidth allocation map (MAP) messages on the downstream channel. The MAP defines the allowed usage of all mini-slots. Mini-slot regions that are not allocated to any transmit opportunities are described by an information element (IE) in the MAP assigned to the null service identifier (NULL SID), which is (0x0000). The IE includes a Service Identifier (SID), a type code (e.g., an Interval Usage Code (IUC)), and a starting offset. Because all CMs 250 scan all IEs, it is preferable that IEs be short and relatively fixed format.

A MAP message defines the use to which each time slot may be put on a particular channel. A MAP message generally also includes information about time slots on the channel. This information includes: the slot's start time; its duration; the CM or CMs 250 which are allowed to use that slot; and the type of transmission it or they may use the slot for. Transmission type is specified by an Interval Usage Code (IUC). Each IUC has a designated purpose, e.g. for requests (i.e. transmit a request, such as transmit a request for bandwidth of the upstream service flow), for long data transmissions, for short data transmissions, for maintenance activities, et al. When the MAP indicates that a particular CM 250 may use a given time slot, the CM 250 may transmit a burst of the specified type during that time slot. A burst is defined by the period during which the CM's transmitter is on. The CM's transmitter must be off during any timeslot in which the CMTS 210 has not specifically given that CM 250 (or a group of CMs to which it belongs) permission to transmit.

In some examples, the MAP may also include an IE which includes a generic service identifier (G-SID), a corresponding type code (e.g., IUC), and a starting offset. The G-SID defines what modem or modems can transmit (through a service identifier, G-SID). In an embodiment, the G-SID is assigned for multiple service flows of the CM 250. The IE including the G-SID defines the information related to the multiple service flows that may be transmitted. The IUC may instruct the purpose of the MAP (i.e., what type of transmission is allowed), the purpose or the type of transmission may be request transmission or service data transmission, or maintenance activities. For example, the IUC instructs the CM 250 to request the bandwidth via an instruction of the offset, or the IUC instructs the CM 250 to transmit long data or short data via the time slot instructed by the offset. The offset instructs permitted time mini-slot(s), or time slots for the transmission. The transmission identified by the MAP may be a request transmission or data transmission based on the instruct purpose of the IUC.

The DOCSIS allocation MAP is a media access control (MAC) management message which is transmitted by the CMTS 210 on the downstream channel and which describes, for some interval, the uses of the upstream mini-slots. A given MAP may describe some slots as grants in which particular CMs 250 may transmit data, other slots as available for contention transmission, and other slots as an opportunity for new CMs 250 to join the link. The other slots as available for contention transmission may be related to the G-SID, the slots as available for contention transmission may use to transmit data of any service of the CM 250 which gets the contention transmission.

In DOCSIS 3.1 MULPI, some service flows may use a contention request opportunity for upstream transmissions such as nrtPS and BE service. A DOCSIS full duplex (FDX) workgroup decided to remove contention-based schemes from FDX channels. Instead, the downstream (DS) spectrum is to be used for upstream (US) transmissions when the DS channel is not used. However, contention-based schemes may be used for legacy DOCSIS US channels and the US channels not using DOCSIS FDX. Channel bonding is permitted, and bonding groups may include both legacy and current US channels.

To accommodate contention request requirements in such group, there may be unsolicited grant opportunities for such services, granting of different unicast opportunities for different services, or granting one unicast opportunity for multiple service flows using nrtPS or best effort (BE).

Figure 2:
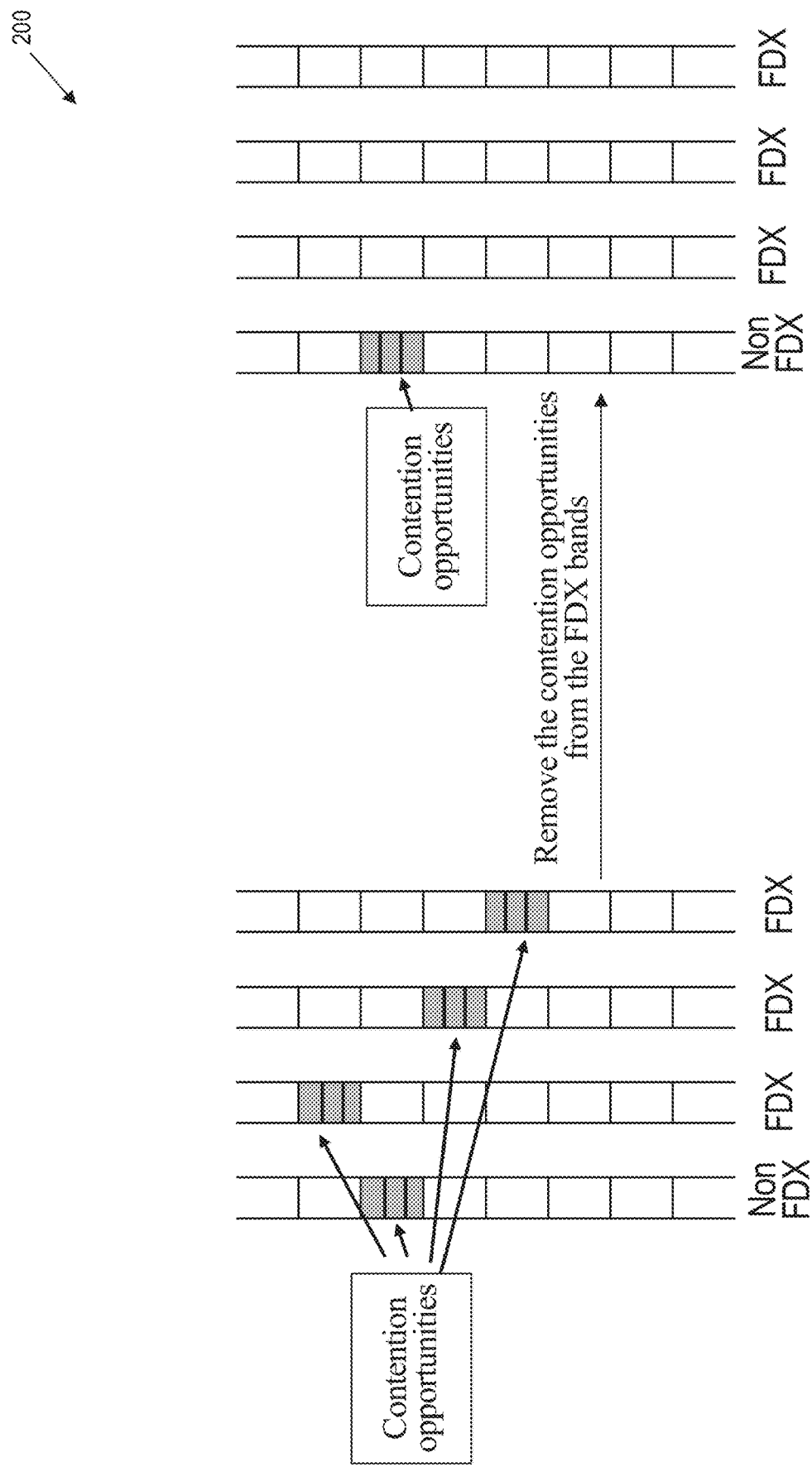
FIG. 2 illustrates contention requests to the contention opportunities in an embodiment.

FIG. 2 illustrates such contention requests. In FIG. 2, if the contention opportunities are removed from FDX bands, the FDX CMs 250 will use contention opportunities for non-FDX channels, resulting in more collisions and increased latency.

FIG. 3A illustrates a table of service flows stored in the CM 250 in an embodiment. As an example illustrated by the table 300A, the CM 250 activates 3 service flows, and the SIDs for the 3 service flows are SID 1, SID 2, and SID 3.

FIG. 3B illustrates the service IDs of service flows of the CM 250 stored in the CMTS 210 in an embodiment. As an example illustrated by the table 300B, the CMTS 210 stores the SIDs of the 3 service flows of the CM 250. The SIDs of the 3 service flows are SID 1, SID 2, and SID 3.

FIG. 3C illustrates entries of the DOCSIS MAP received by the CM 250 in an embodiment. As an example illustrated by the entries 300C, the MAP sent to the CM a 250 includes 3 entries of the upstream bandwidth, each entry corresponds to one service flow of the CM a 250. As an example, each entry may be an information element (IE). Each IE includes a SID of a service flow, an IUC, and an offset.

FIG. 4A illustrates a mapping between service flow identifiers and G-SID for each of a plurality of CMs 250 in an embodiment. As an example illustrated by the mapping 400A, the CMTS 210 stores the mapping for the CM a 250 and the CM b 250. The CM a 250 activates 3 service flows, and the SIDs for the 3 service flows are SID 1, SID 2, and SID 3. The CMTS 210 assigns G-SID 1 to the CM a 250, and the G-SID 1 also corresponds to the multiple service flows IDs. CM b 250 activates 3 service flows too, and the SIDs for the 3 service flows of CM b 250 are SID 4, SID 5, and SID 6. The CMTS 210 assigns G-SID 2 to the CM b 250. The CMTS 210 stores the mapping between the G-SID and the multiple SIDs for each CM 250. The G-SID comprises an identifier assigned to the CM 250. As an example, there is no difference between the format of the SID and the G-SID.

FIG. 4B illustrates the mapping between the G-SID and the service IDs of the multiple service flows stored in the CM a 250. As an example illustrated by the mapping 400B, the CM a 250 activates 3 service flows, and the SIDs for the 3 service flows are SID 1, SID 2, and SID 3. The CMTS 210 assigns G-SID 1 to the CM a 250.

FIG. 4C illustrates entries of the DOCSIS MAP received by the CM 250 in an embodiment. As an example illustrated by the IE 400C, the MAP sent to the CM a 250 includes a single entry. As an example, the entry may be an information element (IE). The IE includes the CM bandwidth allocation for multiple service flows of the CM a 250 in a single entry of the upstream bandwidth allocation map (MAP) message. The IE corresponds to the multiple service flows of the CM 250. The IE includes the G-SID assigned to the CM 250, an IUC, and an offset.

Figure 4D:
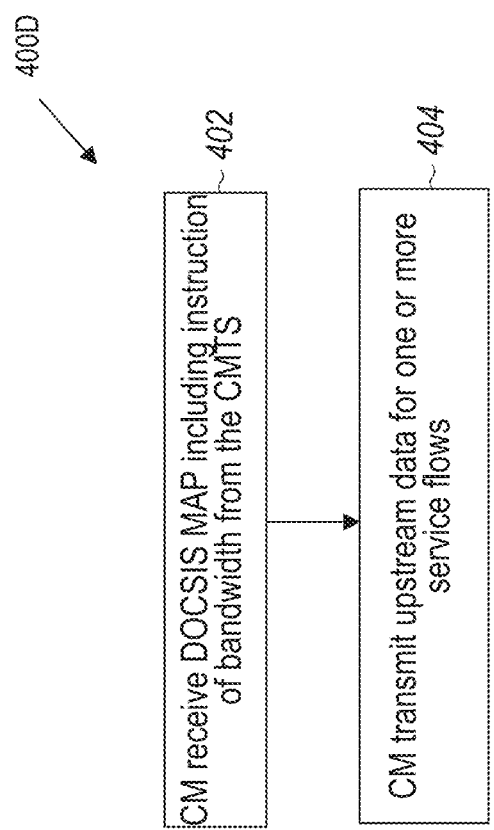
FIG. 4D illustrates a flow chart of a method for transmitting upstream data in the CM 250 in an embodiment.

FIG. 4D illustrates a flow chart of a method for transmitting upstream data in the CM 250 in an embodiment. As an example illustrated by the flow chart 400D, the process described generally above is summarized in the steps of FIG. 4D.

At step 402, the CM 250 receives a DOCSIS MAP message for transmitting the upstream data of the one or more service flows of the CM 250. The DOCSIS MAP for transmitting the upstream data comprises a generic service identifier (G-SID) included in a corresponding information element (IE).

The G-SID comprises an identifier assigned to the CM 250. The G-SID is an identifier for the CM 250. Different CMs 250 have a different G-SID. Each CM 250 communicating with the same CMTS 210 has one G-SID. The G-SID is associated with the multiple service flows of the CM 250. The IE includes the G-SID and a CM bandwidth allocation for transmitting upstream data of one or more of the multiple service flows of the CM 250. The IE comprises a G-SID field which has the value of G-SID assigned to the CM 250 or assigned to the multiple service flows of the CM 250. The upstream data may be service data of the service flow of the CM 250, the upstream data may also be upstream flow of the CM 250.

A format of the IE comprising the G-SID is the same as the format of an IE comprising the SID. The IE comprising the G-SID comprises a G-SID field which replaces a service identifier (SID) in the SID field of the IE. The IE comprising the G-SID may also comprise an IUC field and an offset field. The CM bandwidth allocation may correspond to the IUC field and the offset field.

In the example, the IUC of the IE comprising the G-SID instructs that the CM bandwidth is allocated to the multiple service flows for transmitting upstream or service data to the multiple service flows. In another example, the IUC of IE may also instruct that the CM bandwidth is allocated to the CM 250 for requesting bandwidth for one or more of the multiple service flows of the CM 250.

At step 404, the CM 250 transmits upstream data for one or more service flows of the CM 250 via at least a portion of the CM bandwidth allocation.

After receiving the DOCSIS MAP message from the CMTS 210, the CM 250 determines that the IUC of the IE instructs the CM 250 to transmit upstream data for one or more service flows of the CM 250 via at least the portion of the CM bandwidth allocation. The upstream for the one or more service flows may be service data of the one or more service flows.

As an example, before sending the upstream (service data) of the one or more of the multiple service flows of the CM 250, the CM 250 may further allocate the CM bandwidth to one or more service flows of the CM 250. For example, the CM 250 may allocate the CM bandwidth to the one or more service flows based on a priority of the multiple service flows of the CM 250. The CM 250 may also allocate the CM bandwidth to the one or more service flows based on the service data waiting to be sent of each of the multiple service flows. For example, if only one service flow has service data to be sent, the CM 250 may allocate most of the CM bandwidth to the service flow with service data to be sent.

In the above solution, the bandwidth allocation to the multiple service flows of the CM 250 is only instructed by the single IE comprising the G-SID along with a CM bandwidth allocation for multiple service flows of the CM 250. The single IE replaces one or more IEs comprising an SID for the CM 250 in the upstream bandwidth allocation MAP message, because each service flow needs one IE comprising the SID of the service flow for the upstream bandwidth allocation. Therefore, the IEs in the upstream bandwidth allocation MAP message may be reduced.

Figure 5:
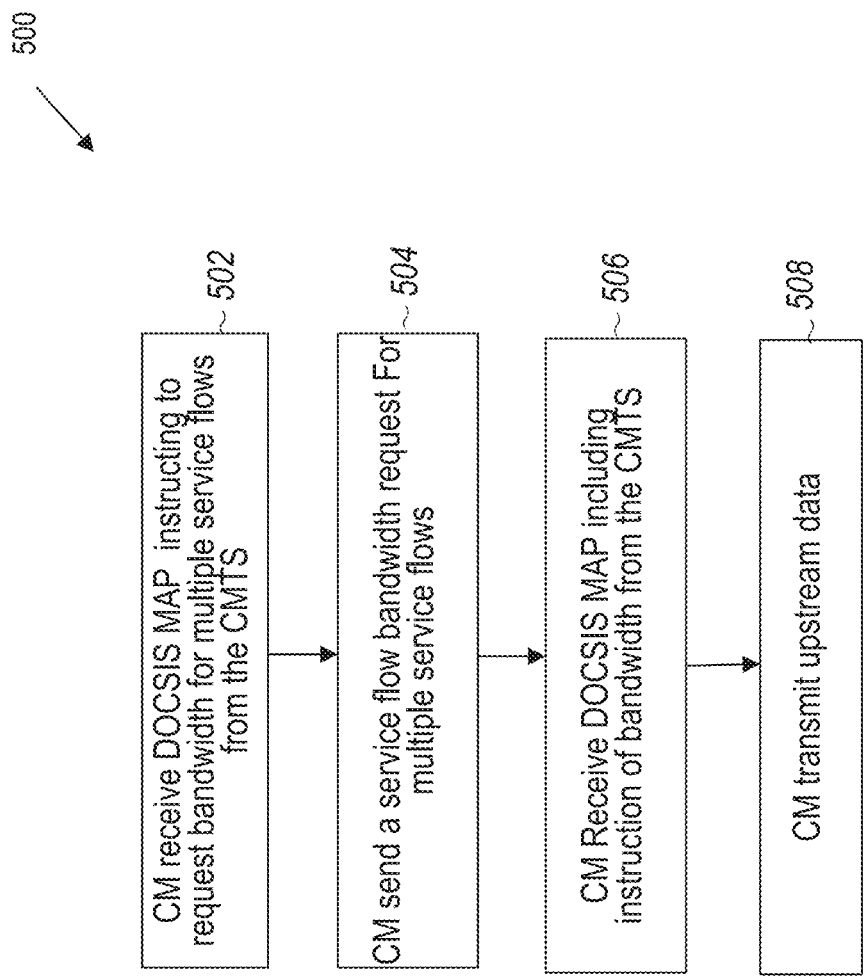
FIG. 5 illustrates a flow chart of a method for transmit upstream data in the CM 250 in an embodiment.

FIG. 5 illustrates a flow chart of a method for transmit upstream data in the CM 250 in an embodiment. As an example illustrated by the flow chart 500, the process described generally above is summarized in the steps of FIG. 5.

At step 502, the CM 250 receives a DOCSIS MAP for requesting CM bandwidth for multiple service flows of the CM 250. The DOCSIS MAP for requesting CM bandwidth comprises a generic service identifier (G-SID) included in a corresponding information element (IE).

The G-SID comprises an identifier assigned to the CM 250. The IE includes the G-SID field along with a CM bandwidth allocation for requesting bandwidth for one or more service flows of the CM 250. The G-SID field has the value of the identifier assigned to the CM 250. The G-SID may also be an identifier assigned to the multiple identifiers of the CM 250.

A format of the IE comprising the G-SID is the same as the format of an IE comprising the SID. The IE comprising the G-SID comprises a G-SID field which replaces a service identifier (SID) in the SID field of the IE. The IE comprising the G-SID may also comprise an IUC field and an offset field. The CM bandwidth allocation for requests may correspond to the IUC field of the IE and the offset field of the IE.

The IUC of IE instructs that the CM bandwidth is allocated to the CM 250 for requesting bandwidth for the one or more of the multiple service flows associated with the G-SID of the CM 250.

At step 504, the CM 250 sends a service flow bandwidth request to the CMTS 210. The service flow bandwidth request is for requesting the bandwidth for one or more service flows associated with the G-SID of the CM 250.

The one or more service flows associated with the G-SID of the CM 250 are the one or more service flows of the CM 250.

After receiving the DOCSIS MAP message, the CM 250 determines that the IUC of the IE comprising the G-SID instructs the CM 250 to request the bandwidth via the mini-slot or the slot instructed by the offset of the IE.

As an example, the service flow bandwidth request may be a single service flow bandwidth request for requesting the bandwidth for the single service flow via a time slot instructed the offset of the IE. The single service flow request comprising a SID of the single service flow. The SID in the single flow bandwidth request may be any one of the SID1, SID2 or SIDS, which identifies that the service flow needs bandwidth allocation for transmitting upstream data.

In another example, the service flow bandwidth request may be a multiple service flows bandwidth request for requesting the bandwidth for the multiple service flows via a time slot instructed by the IE. The multiple service flows bandwidth request comprises the G-SID.

Before sending the service flow bandwidth request, the CM 250 determines that the one or more service flows of the CM 250 need the bandwidth for transmitting upstream data. If there is only one service flow that needs the bandwidth for transmitting upstream data, the CM 250 may send a single service flow bandwidth request. If there are at least two service flows that need bandwidth allocation for transmitting upstream data, the CM 250 may send a multiple service flow bandwidth request.

At step 506, the CM 250 receives a DOCSIS MAP message for transmitting the upstream data of the one or more service flows of the CM 250.

The DOCSIS MAP message for transmitting the upstream data at step 506 may refer to the DOCSIS MAP message for transmitting the upstream data at step 402, which is also named the information DOCSIS MAP message.

If the CM 250 sends the single service flow bandwidth request to the CMTS 210 at step 504, the DOCSIS MAP message comprises the IE comprising a SID field along with a CM bandwidth allocation for the single service flow.

If the CM 250 sends the multiple service flow bandwidth request to the CMTS 210 at step 504, the DOCSIS MAP message comprises the IE comprising the G-SID along with a CM bandwidth allocation for transmitting for service data of multiple service flows of the CM 250. The IE 400C comprises the G-SID field, which has the value of the identifier assigned to the CM 250. The G-SID may also be the identifier assigned to the multiple identifiers of the CM 250.

At step 508, the CM 250 transmits upstream data for one or more service flows of the CM 250 via at least a portion of the CM bandwidth allocation.

In this solution, the MAP for requesting sent by the CMTS 210 instructs the CM 250 to request bandwidth for one or more service flows via comprising the G-SID in the MAP. The G-SID in the MAP for requesting may enable the CM 250 request the bandwidth for anyone of the multiple service flows of the CM 250 via sending a single service flow bandwidth request comprising the SID. The G-SID in the MAP for requesting may also enable the CMTS 210 to not send the MAP for requesting for each service flow of the CM 250.

In another example, the CM 250 may send a multiple service flows bandwidth request for requesting the bandwidth for the multiple service flows, with the multiple service flows bandwidth request being sent via the mini slot or slot instructed by the offset of the IE 400C, and the multiple service flows bandwidth request comprises the G-SID 1.

Before sending the multiple service flows bandwidth request, the CM 250 may further determine from the multiple service flows that at least two service flows need a bandwidth allocation for transmitting upstream data. For example, the CM 250 determines both the service flows identified by SID 1 and SID 2 need bandwidth allocation for the service data to be sent. The CM 250 requests the bandwidth for the both service flows identified by SID 1 and SID 2 at one time via sending the multiple service flows bandwidth comprising the G-SID 1. In another example, the multiple service flows bandwidth request may further comprise the at least two SIDs corresponding to the at least two service data flows, such as the SID1 and the SID 2, to instruct the CMTS 210 to allocate the bandwidth for the at least two service flows identified by the at least two SIDs via one MAP.

The IUC in IE in the DOCSIS MAP message for allocating CM bandwidth instructs the CM 250 transmit upstream data via the mini slot or slot identified by the offset of IE. Before sending upstream data of the one or more of the multiple service flows of the CM 250, the CM 250 further allocates the CM bandwidth to one or more service flows of the CM 250. If there is only one service flow that needs to transmit upstream data, the CM 250 may allocate most of the portion of the CM bandwidth to the single service flow. If the CM 250 determines there are at least two service flows, such as SID 1 and SID2, which need to transmit upstream data, the CM 250 may allocate the most portion of CM bandwidth to the at least service flows, such as SID 1 and SID 2. The SID 1 and SID 2 in the multiple service flows allocation request may further instruct the CMTS 210 to allocate the bandwidth to the service flows identified by SID 1 and SID 2, and send the allocation via the MAP one time.

In an embodiment, the CMTS 210 allocates the G-SID 1 to the CM a 250 for corresponding to the multiple service flows, such as SID 1, SID 2, and SID 3 of the CM a 250. Therefore, the G-SID 1 is stored in the CM a 250 for corresponding to the multiple service flows of the CM a 250.

FIG. 6 illustrates a flow chart of a method for transmitting upstream data in the CM 250 in an embodiment. As an example illustrated by the flow chart 600, the process described generally above is summarized in the steps of FIG. 6.

At step 602, the CMTS 210 sends a DOCSIS MAP or a DOCSIS P-MAP for transmitting the upstream data of the one or more service flows of the CM 250 to the CM 250.

As another example, the CMTS 210 may also send a DOCISI P-MAP for transmitting the upstream data of the one or more service flows of the CM 250 to the CM 250.

The G-SID comprises an identifier assigned to the CM 250. The G-SID is an identifier for the CM 250. Different CMs 250 have a different G-SID. Each CM 250 communicating with the same CMTS 210 has one G-SID. The G-SID is associated with the multiple service flows of the CM 250. The IE includes the G-SID and a CM bandwidth allocation for transmitting upstream data of one or more of the multiple service flows of the CM 250. The IE 400C comprises a G-SID field which has the value of G-SID assigned to the CM 250 or assigned to the multiple service flows of the CM 250. The G-SID 1 is assigned by the CMTS 210 for the multiple service flows of CM 250, such as the multiple service flows identified by the SID 1, the SID2 and the SID 3 of the CM 250.

A format of the IE comprising the G-SID is the same as the format of an IE comprising the SID. The IE comprising the G-SID comprises a G-SID field which replace a service identifier (SID) in the SID field of the IE. The IE comprising the G-SID may also comprise an IUC field and an offset field. The CM bandwidth allocation may correspond to the IUC field and the offset field.

In the example, the IUC of the IE comprising the G-SID instruct that the CM bandwidth is allocate to the multiple service flows for transmitting upstream or service data to the multiple service flows. In another example, the IUC of IE may also instruct that the CM bandwidth is allocation to the CM 250 for requesting bandwidth for one or more of the multiple service flows of the CM 250.

At step 604, the CMTS 210 receives upstream data of one or more of the multiple service flows of the CM 250.

In this solution, the MAP sent by the CMTS 210 instructs the CM 250 to transmit upstream data of one or more of the multiple service flows via the CM bandwidth for the multiple service flows. The G-SID in the MAP for allocating CM bandwidth may enable the CMTS 210 to not send the IE for each of the multiple service flows of the CM 250.

FIG. 7 illustrates a flow chart of a method for transmitting upstream data in the CM 250 in an embodiment. As an example illustrated by the flow chart 700, the process described generally above is summarized in the steps of FIG. 7.

At step 702, the CMTS 210 sends a DOCSIS MAP or a DOCSIS P-MAP for requesting CM bandwidth for multiple service flows of the CM 250 to the CM 250. The DOCSIS MAP for requesting CM bandwidth comprises a generic service identifier (G-SID) included in a corresponding information element (IE). The DOCSIS MAP for requesting CM bandwidth may refer to the information DOCSIS MAP, and may also refer to the DOCSIS MAP at step 502.

The G-SID comprises an identifier assigned to the CM 250. The IE includes the G-SID field along with a CM bandwidth allocation for requesting bandwidth for one or more service flows of the CM 250. The G-SID field has the value of the identifier assigned to the CM 250, and the G-SID may also be an identifier assigned to the multiple identifiers of the CM 250.

As another example, the G-SID is assigned to multiple service flows of the CM 250. A format of the IE comprising the G-SID is the same as the format of an IE comprising the SID. The IE comprising the G-SID comprises a G-SID field, which replaces a service identifier (SID) in the SID field of the IE. The IE comprising the G-SID may also comprise an IUC field and an offset field. The CM bandwidth allocation request may correspond to the IUC field and the offset field.

The IUC of IE instructs that the CM bandwidth is allocated to the CM 250 for requesting bandwidth for one or more of the multiple service flows of the CM 250.

At step 704, the CMTS 210 receives a service flow bandwidth request from the CM 250.

As an example, the service flow bandwidth request may be a single service flow bandwidth request for requesting the bandwidth for the single service flow via a time slot instructed the offset of the IE. The single service flow request comprising a SID of the single service flow. The SID in the single flow bandwidth request may be anyone of the SID1, SID2, or SID3, which identifies the service flow needed for bandwidth allocation for transmitting upstream data.

In another example, the service flow bandwidth request may be a multiple service flows bandwidth request for requesting the bandwidth for the multiple service flows via a time slot instructed by the IE. The multiple service flows bandwidth request comprises the G-SID.

At step 706, the CMTS 210 allocates the bandwidth for the one or more service flow of the CM 250.

For the single service flow bandwidth request, the CMTS 210 allocates the bandwidth for the service flow identified by the SID in the first request.

For the multiple service flow bandwidth request, the CMTS 210 allocates the bandwidth for the multiple service flows of the CM 250. For example, the CMTS 210 allocates the bandwidth for the SID 1, SID 2, and SID 3. In another example, if the single service flow bandwidth request further comprises at least two SIDs, the CMTS 210 allocates the bandwidth for the at least two service flows identified by the at least two SIDs.

At step 708, the CMTS 210 send a DOCSIS MAP for transmitting upstream data of the one or more service flows of the CM 250. The one or more service flows is associated to the GID. The DOCSIS MAP for transmitting upstream data may refer to the DOCSIS MAP at step 402 or step 506.

If the CM 250 sends the single service flow bandwidth request to the CMTS 210 at step 704, the DOCSIS MAP message for transmitting upstream data comprises the IE comprising a SID field along with a CM bandwidth allocation for the single service flow.

If the CM 250 sends the multiple service flow bandwidth request to the CMTS 210 at step 704, the DOCSIS MAP message for transmitting upstream data comprises the IE comprising the G-SID and a CM bandwidth allocation for transmitting for service data of multiple service flows of the CM 250. The IE 400C comprises the G-SID field which has the value of the identifier assigned to the CM 250, and the G-SID may also be an identifier assigned to the multiple service flows of the CM 250.

Figure 8:
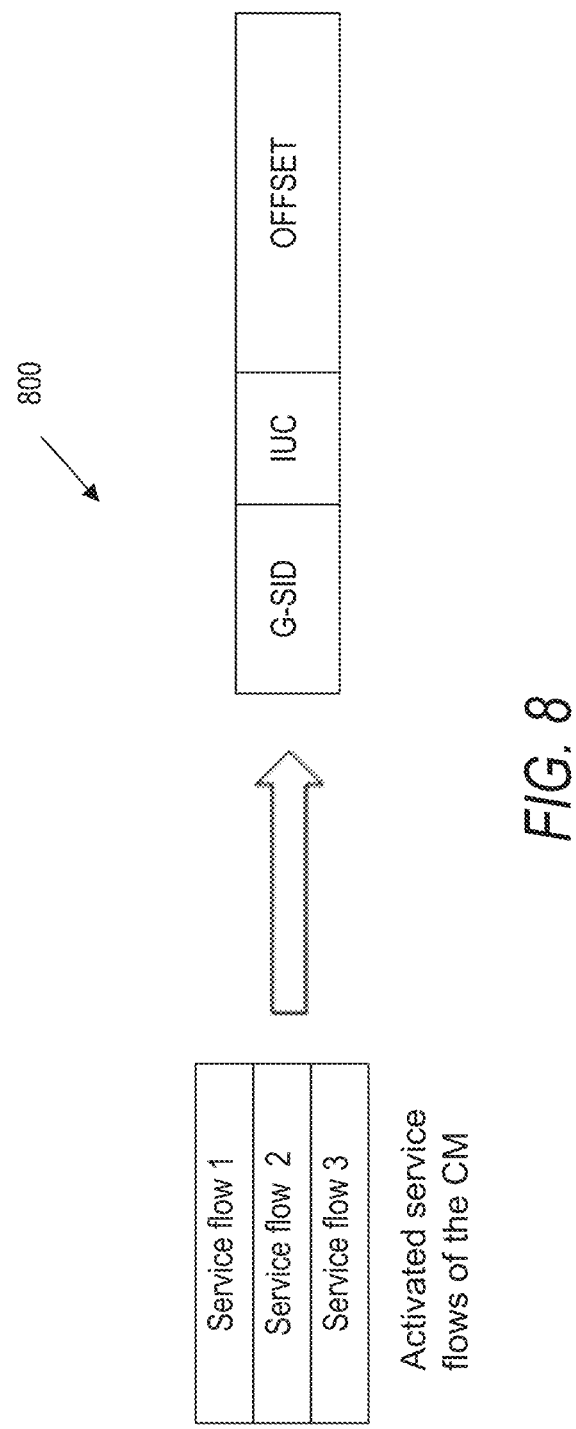
FIG. 8 is a diagram illustrating a G-SID according to an embodiment of the disclosure.

FIG. 8 is a diagram 800 illustrating a G-SID according to an embodiment of the disclosure. After setting one G-SID for a CM general service flow (the general service flow is a virtual service flow which corresponds to the multiple service flows of the CM, this means that the G-SID is assigned or set for the multiple service flows of the CM 250), the CMTS 210 and the CM 250 may map the regular service flow (which means the multiple service flows of the CM 250) to the generic service flow related to the G-SID. Both the CMTS 210 and the CM 250 may map the G-SID of the general service flow of the CM 250 to the SIDs of the regular service flows, SID 1, SID2, and SID 3 of the CM 250. This does not impact the regular service flow. The CM 250 adds the policy describing how to use the scheduling policy or the intelligent scheduling. The CM 250 may use the G-SID for bandwidth requests or use the service flow SID for separate bandwidth requests based on the CM 250 policy setting. If the CM 250 uses the G-SID, then the CMTS 210 issues grants based on the G-SID. If the CM 250 does not use the G-SID, then the CMTS 210 complies with the regular DOCSIS scheduling mechanism. The CMTS 210 may issue unsolicited grants based on the G-SID, and the CM 250 may use the grants based on its scheduling policy.

The CMTS 210 may store the G-SID for each of the plurality of CMs 250. The G-SID for different CMs 250 may be different. As such, each CM 250 has set its own G-SID. The G-SID maps to each SID of the multiple service flows (also referred to as regular service flows). In another example, the different CMs 250 may have a same G-SID. The CMTS 210 may use the G-SID to issue unsolicited grants for all of the CMs 250 via the contention opportunities. The CM 250 which received the DOCSIS MAP message via the contention opportunities may use the time slot identified by the offset corresponding to the G-SID in the DOCSIS MAP message to transmit the service data of any one of the service flows of the CM 250.

In the example, the CM 250 requests the bandwidth via the G-SID. After the CMTS 210 receives the request carrying G-SID for requesting the bandwidth for the service flow of the CM 250, the CMTS 210 may determine whether a DOCSIS MAP message comprising a SID of the service flow of the CM 250 has been sent to the CM 250. If the DOCSIS MAP message comprising a SID of the service flow of the CM 250 has been sent to the CM 250, it means that the CMTS 210 has allocated bandwidth for the service flow corresponding to the SID of the CM 250, and the CMTS 210 may allocate bandwidth for the multiple service flows of the CM 250 based on a first policy stored in the CMTS 210. If the DOCSIS MAP message comprising a SID of the service flow of the CM 250 hasn't been sent to the CM 250, it means that the CMTS 210 has not allocated bandwidth for the service flow of the CM 250, and the CMTS 210 may allocate bandwidth for the multiple service flows of the CM 250 based on a second policy stored in the CMTS 210. The first policy stored in the CMTS 210 identifies allocating bandwidth to the CM 250 when the service data in the queue of the CM 250 extends a waiting threshold for waiting to transmit. The second policy stored in the CMTS 210 identifies allocating bandwidth to the CM 250 even if there are a lot of service data to be sent.

Figure 9:
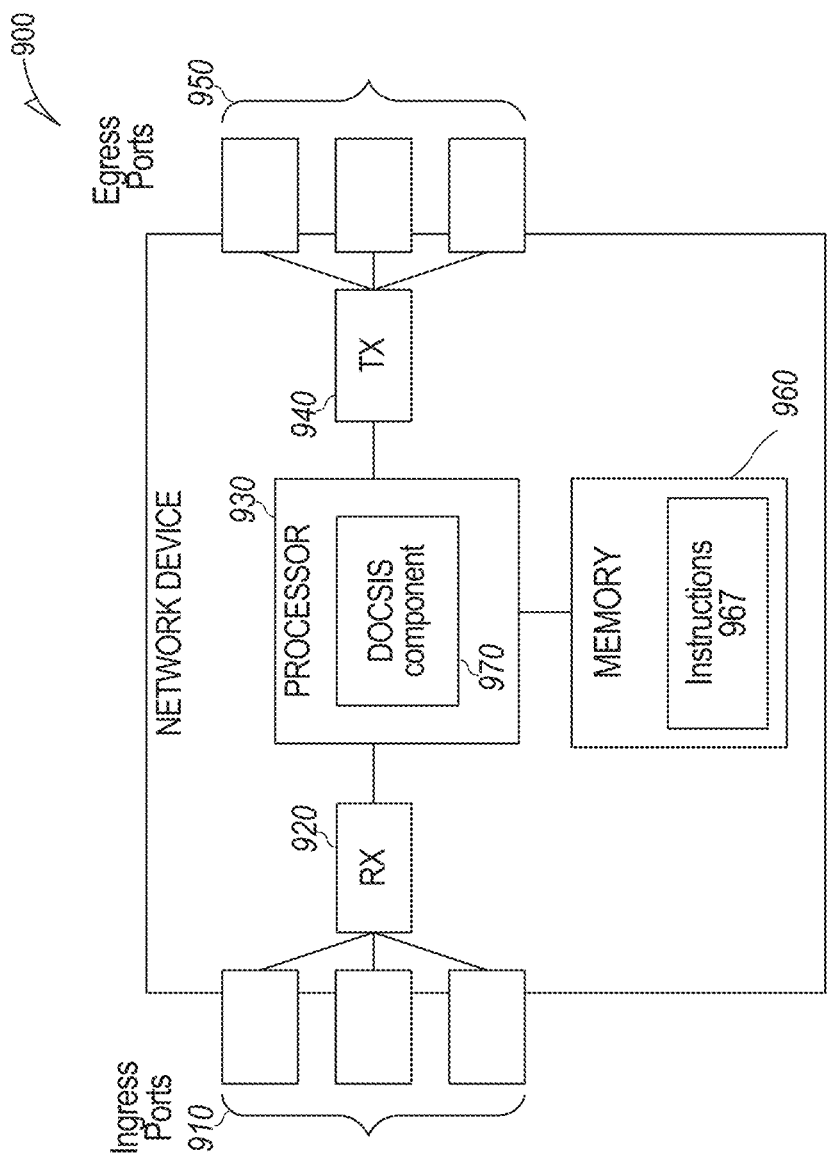
FIG. 9 is a schematic diagram of a device according to an embodiment of the disclosure.

FIG. 9 is a schematic diagram of a network device 900 according to an embodiment of the disclosure. The network device 900 may implement the disclosed embodiments. The network device 900 may implement a cable modem (CM). The network device 900 may implement the cable modem termination system (CMTS). The device 900 comprises ingress ports 910 and an RX 920 coupled to the ingress ports 910 and configured for receiving data; a processor, logic unit, or CPU 930 coupled to the RX 920 and configured to process the data; a TX 940 coupled to the processor 930 and configured for transmitting the data; and a memory 960 coupled to the processor 930 and configured for storing the data. The device 900 may also comprise OE components and EO components coupled to the ingress ports 910, the RX 920, the TX 940, and/or the egress ports 950 for ingress or egress of optical or electrical signals.

The processor 930 is any suitable combination of hardware, middleware, firmware, or software. The processor 930 comprises any combination of one or more CPU chips, cores, FPGAs, ASICs, or DSPs. The processor 930 communicates with the ingress ports 910, RX 920, TX 940, egress ports 950, and memory 960. The processor 930 comprises a DOCSIS component 970, which implements the disclosed embodiments. The inclusion of the DOCSIS component 970 therefore provides a substantial improvement to the functionality of the device 900 and effects a transformation of the device 900 to a different state. Alternatively, the memory 960 stores the DOCSIS component 970 as instructions 967, and the processor 930 executes those instructions 967.

The memory 960 comprises one or more disks, tape drives, or solid-state drives. The device 900 may use the memory 960 as an over-flow data storage device to store programs when the device 900 selects those programs for execution and to store instructions and data that the device 900 reads during execution of those programs. The memory 960 may be volatile or non-volatile and may be any combination of ROM, RAM, TCAM, or SRAM. The memory 960 stores the instructions 967, wherein the processor 930 can access and execute the instructions 967.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

In an example, the network device 900 comprises a CMTS 210. The network device 900 in this example includes a memory storage 960 comprising instructions 967 and one or more processors 930 in communication with the memory 960. The one or more processors 930 execute the instructions 967 to send a data over cable service interface specification (DOCSIS) upstream bandwidth allocation MAP message to a cable modem (CM), with the DOCSIS upstream bandwidth allocation MAP message including a generic service identifier (G-SID) in a corresponding information element (IE), the G-SID comprising an identifier assigned to the CM 250, with the IE including the G-SID and a CM 250 bandwidth allocation for multiple service flows of the CM 250. The one or more processors 930 further execute the instructions 967 to receive the upstream data for one or more service flows of the CM 250 via at least a portion of the CM 250 bandwidth allocation.

In an example, the network device 900 comprises a CM 250. The network device 900 in this example includes a memory storage 960 comprising instructions 967 and one or more processors 930 in communication with the memory 960. The one or more processors 930 execute the instructions 967 to receive a generic service identifier (G-SID) included in a corresponding information element (IE) in a data over cable service interface specification (DOCSIS) upstream bandwidth allocation MAP message, with the G-SID comprising an identifier assigned to the CM 250, with the IE including the G-SID and a CM 250 bandwidth allocation for multiple service flows of the CM 250. The one or more processors 930 further execute the instructions 967 to transmit the upstream data for one or more service flows of the CM 250 via at least a portion of the CM bandwidth allocation.

Figure 10A:
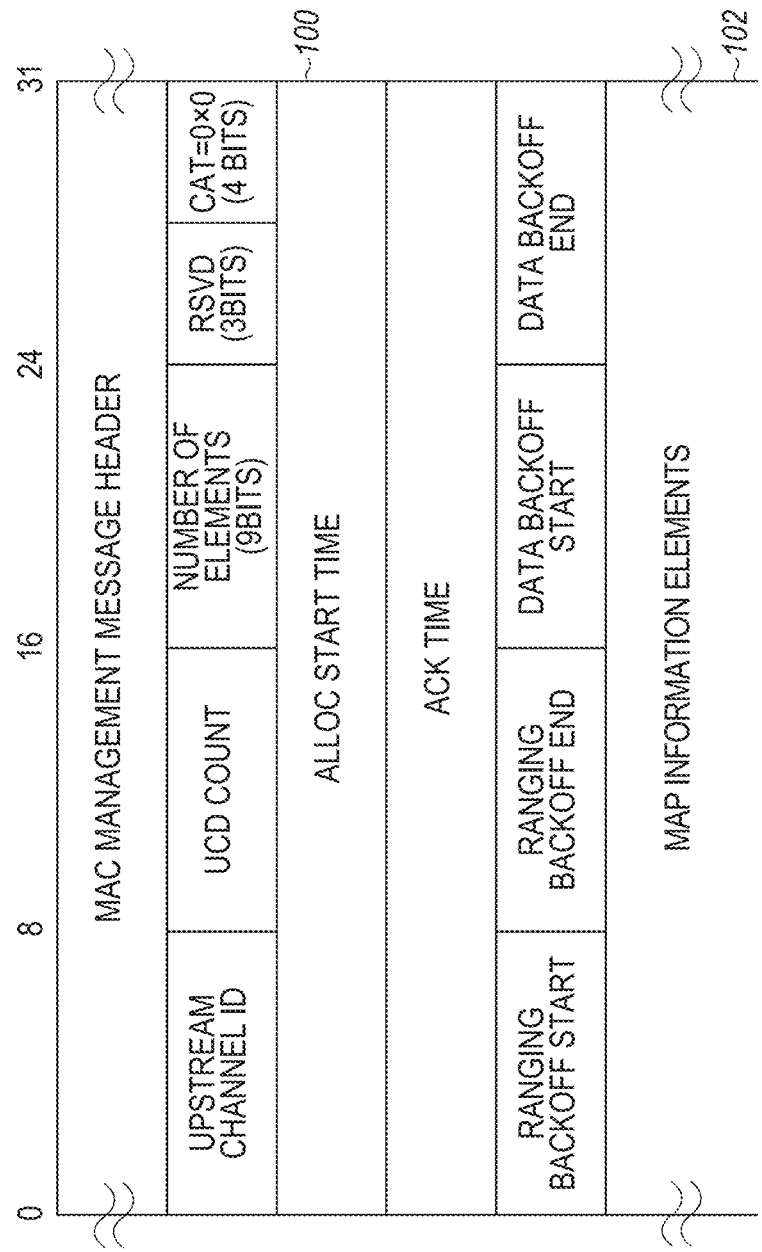
FIG. 10A is a modified upstream bandwidth allocation MAP in a sample embodiment.

FIG. 10A is a modified upstream bandwidth allocation MAP 100 in a sample embodiment. The MAP 100 is standard except for the inclusion of MAP information elements 102.

Figure 10B:
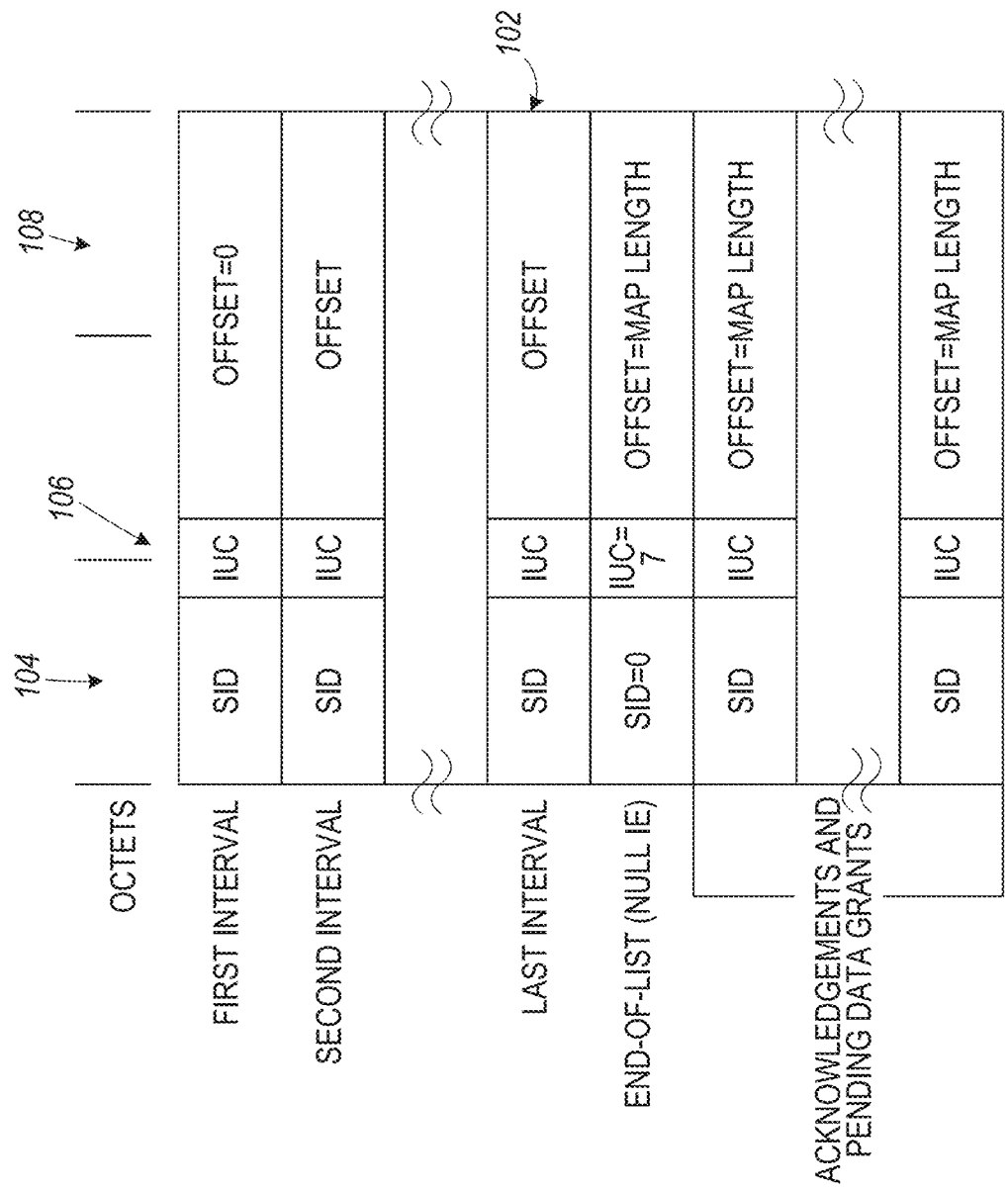
FIG. 10B is an information element structure of the modified upstream allocation map of FIG. 8A.

FIG. 10B is an information element structure of the modified upstream allocation map of FIG. 8. The modified upstream allocation map can be used for the MAP information elements 102 for allocating upstream bandwidth to the CMs 250 for transmission upstream data in a sample embodiment. Mini-slot regions that are not allocated to any transmit opportunities are described by an information element (IE) in the MAP 100 assigned to the NULL SID (0x0000). As illustrated in FIG. 8, each IE includes a 14-bit Service ID (SID/Service Identifier) or G-SID which comprises the lower 14 bits of a 16-bit field, a 4-bit type code (IUC/Interval Usage Code) 106, and a 14-bit starting offset 108. The service identifier (SID) 104 identifies the flow direction and is assigned by the CMTS 210 (in addition to a service flow identifier) to an active or admitted upstream Service Flow. A CM 250 is not allowed to transmit on an upstream channel without a valid upstream bandwidth allocation provided by the DOCSIS MAP or P-MAP. If a MAP is missed due to error, the CM 250 is not allowed to transmit on the corresponding channel for the period covered by the MAP.

Figure 11:
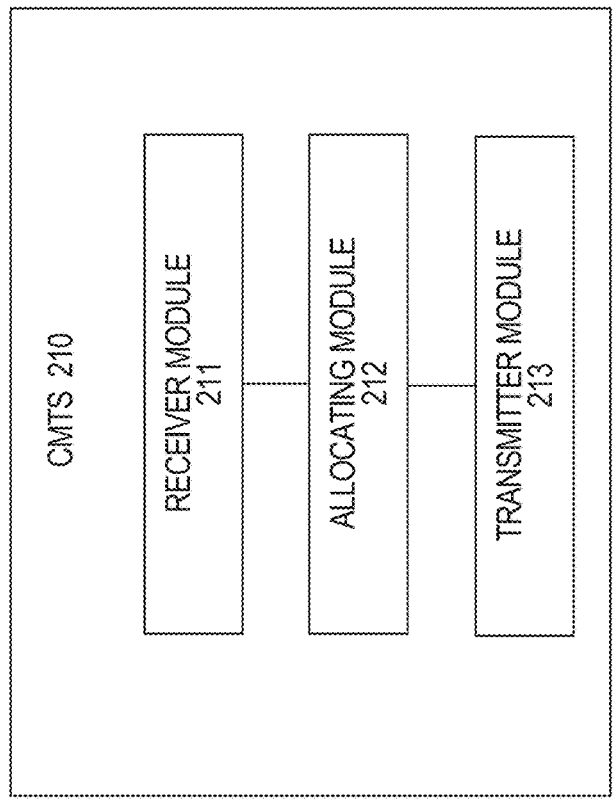
FIG. 11 illustrates an example of a block diagram of the CM that may be used for implementing the methods according to any embodiment herein.

FIG. 11 illustrates an example of a block diagram of the CM 250 that may be used for implementing the methods according to any embodiment herein. The CM 250 includes a receiver module 251, a determining module 252, and a transmitter module 253.

The receiver module 251 is connected to the determining module 252, and the receiver module 251 is configured to communicate with the CMTS 210. The receiver module 251 is further configured to communicate with the transmitter module 253. The determining module 252 is connected to and communicates with the receiver module 251 and the transmitter module 253. The transmitter module 253 is connected to the determining module 252, and the transmitter module 253 is configured to communicate with the CMTS 210.

The receiver module 251 is configured to receive a generic service identifier (G-SID) included in a corresponding information element (IE) in a data over cable service interface specification (DOCSIS) upstream bandwidth allocation MAP message, with the G-SID comprising an identifier assigned to the CM 250, with the IE including the G-SID and a CM bandwidth allocation for multiple service flows of the CM 250.

The transmitter module 253 is configured to transmit the upstream data for one or more service flows of the CM 250 via at least a portion of the CM bandwidth allocation.

The determining module 252 is configured to determine the amount of bandwidth to request from the CMTS 210. The determining module 252 is configured to request bandwidth for all service flows to be transmitted upstream by the CM 250 to the CMTS 210. The determining module 252 is configured to distribute the received CM bandwidth allocation between service flows. The CMTS 210 issues a block allocation of bandwidth to the CM 250, wherein the CMTS 210 does not allocate bandwidth to individual service flows but instead allocates bandwidth for the CM 250 as a whole. The CM 250 then distributes the allocated bandwidth among the service flows of the CM 250, and the CMTS 210 may not be aware of bandwidth portions each service flow receives from the CM 250. The determining module 252 therefore can decide which service flows are awarded a bandwidth portion of the received CM bandwidth allocation. The determining module 252 can evenly distribute the received CM bandwidth allocation, can unevenly distribute the received CM bandwidth allocation (i.e., can give a service flow more than an even portion), or can deprive specific service flows of bandwidth. The determining module 252 therefore can decide priorities of each service flow. The determining module 252 therefore can decide when to give a service flow a bandwidth portion.

It is understood that except for the above functions, a receiver module 251, a determining module 252, and a transmitter module 253, may also perform the functions of the CM 250 described in FIGS. 1-10B.

Figure 12:
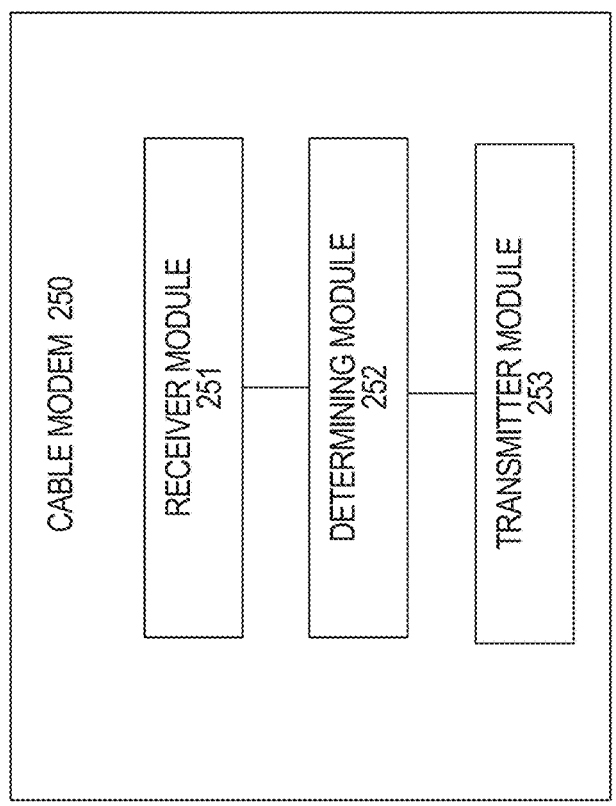
FIG. 12 illustrates an example of a block diagram of the CMTS that may be used for implementing the methods according to any embodiment herein.

FIG. 12 illustrates an example of a block diagram of the CMTS 210 that may be used for implementing the methods according to any embodiment herein. The CM 250 includes a receiver module 211, an allocating module 212, and a transmitter module 213.

The receiver module 211 is connected to the allocating module 212, and the receiver module 211 is configured to communicate with the each of the CMs 250. The receiver module 211 is further configured to communicate with the transmitter module 213. The allocating module 212 is connected to and communicates with the receiver module 211 and the transmitter module 213. The transmitter module 213 is connected to the determining module 252, and the transmitter module 213 is configured to communicate with the CMTS 210. The transmitter module 253 is further configured to communicate with the receiver module 211.

The transmitter module 211 is configured to send a generic service identifier (G-SID) included in a corresponding information element (IE) in a data over cable service interface specification (DOCSIS) upstream bandwidth allocation MAP message, with the G-SID comprising an identifier assigned to the CM 250, with the IE including the G-SID and a CM bandwidth allocation for multiple service flows of the CM 250.

The receiver module 213 is configured to receive the upstream data for one or more service flows of the CM 250 via at least a portion of the CM bandwidth allocation.

The allocating module 212 is configured to allocate the bandwidth for the one or more service flow of the CM 250. If an allocation request including a G-SID is received by the CMTS 210, the allocating module 212 can allocate the CM bandwidth allocation per the G-SID, for the CM 250.

It is understood that except for the above functions, a receiver module 211, an allocating module 212, and a transmitter module 213, may also perform the functions of the CMTS 210 described in FIGS. 1-10B.

Those skilled in the art will appreciate that the transmitting service data method described herein provides technical advantages over conventional DOCSIS systems. For example, by using the G-SID in an information element described herein, the CMTS 210 is able to allocate bandwidth for the multiple service flows of the CM 250 at one time and to instruct a CM 250 to transmit the upstream data (which may also be service data or upstream service flow) of any one of the multiple service flows of the CM 250. Using the G-SID for requesting the bandwidth for the multiple service flows of the CM 250 at one time, this may avoid the CM 250 to request the bandwidth for each of the multiple service flows via the SID separately.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for transmitting upstream data in a cable network, comprising:

receiving, by a cable modem (CM), a generic service identifier (G-SID) included in a corresponding information element (IE) in a data over cable service interface specification (DOCSIS) upstream bandwidth allocation MAP message, the G-SID comprising an identifier assigned to the CM, the IE including a CM bandwidth allocation for multiple service flows of the CM in a single entry of the upstream bandwidth allocation MAP message; and transmitting, by the CM, upstream data for one or more service flows of the CM via at least a portion of the CM bandwidth allocation.

2. The method of claim 1, wherein the CM distributes the CM bandwidth allocation among the multiple service flows.

3. The method of claim 1, wherein the CM bandwidth allocation for the multiple service flows is identified by the G-SID.

4. The method of claim 1, wherein the method further comprises the initial steps of:
receiving, by the CM, an informational DOCSIS MAP message, with the informational DOCSIS MAP message including the G-SID and a request bandwidth allocation for requesting CM bandwidth, the request bandwidth allocation comprising a bandwidth for allocation requests transmitted by the CM; and
requesting, by the CM, a bandwidth allocation for one or more service flows of the CM.

5. A cable modem (CM), comprising:
a memory storage comprising instructions; and
one or more processors in communication with the memory storage, wherein the one or more processors execute the instructions to:
receive a generic service identifier (G-SID) included in a corresponding information element (IE) in a data over cable service interface specification (DOCSIS) upstream bandwidth allocation MAP message, the G-SID comprising an identifier assigned to the CM, the IE including a CM bandwidth allocation for multiple service flows of the CM in a single entry of the upstream bandwidth allocation MAP message; and
transmit the upstream data for one or more service flows of the CM via at least a portion of the CM bandwidth allocation.

6. The CM of claim 5, wherein the CM distributes the CM bandwidth allocation among the multiple service flows.

7. The CM of claim 5, wherein the CM bandwidth allocation for the multiple service flows is identified by the G-SID.

8. The CM of claim 5, with the one or more processors further executing the instructions to:
receive an informational DOCSIS MAP message, with the informational DOCSIS MAP message including the G-SID along with a request bandwidth allocation for requesting CM bandwidth, with the request bandwidth allocation comprising a bandwidth for allocation requests transmitted by the CM, the IE including the CM bandwidth allocation; and
request a bandwidth allocation for one or more service flows of the CM.

9. A method for transmitting upstream data in a cable network, comprising:
sending, by a cable modem termination system (CMTS), a data over cable service interface specification (DOCSIS) upstream bandwidth allocation MAP message to a cable modem (CM), the DOCSIS upstream bandwidth allocation MAP message including a generic service identifier (G-SID) in a corresponding information element (IE), the G-SID comprising an identifier assigned to the CM, the IE including a CM bandwidth allocation for multiple service flows of the CM in a single entry of the upstream bandwidth allocation MAP message; and receiving, by the CMTS, upstream data for one or more service flows of the CM via at least a portion of the CM bandwidth allocation.

10. The method of claim 9, wherein the CM bandwidth allocation for the multiple service flows is identified by the G-SID.

11. The method of claim 9, the method further comprises the initial steps of:
transmitting, by the CMTS, an informational DOCSIS MAP message to the CM, with the informational DOCSIS MAP message including the G-SID along with a request bandwidth allocation for requesting CM bandwidth, with the request bandwidth allocation comprising a bandwidth for allocation requests transmitted by the CM, the IE including the CM bandwidth allocation; and
receiving, by the CMTS, a bandwidth allocation for one or more service flows from the CM.

12. A cable modem termination system (CMTS), comprising:
a memory storage comprising instructions; and
one or more processors in communication with the memory storage, wherein the one or more processors execute the instructions to:
send a data over cable service interface specification (DOCSIS) upstream bandwidth allocation MAP message to a cable modem (CM), the DOCSIS upstream bandwidth allocation MAP message including a generic service identifier (G-SID) in a corresponding information element (IE), the G-SID comprising an identifier assigned to the CM, the IE including a CM bandwidth allocation for multiple service flows of the CM in a single entry of the upstream bandwidth allocation MAP message; and
receive the upstream data for one or more service flows of the CM via at least a portion of the CM bandwidth allocation.

13. The CMTS of claim 12, wherein the CM bandwidth allocation for the multiple service flows is identified by the G-SID.

14. The CMTS of claim 12, with the one or more processors further executing the instructions to:
transmit an informational DOCSIS MAP message to the CM, with the informational DOCSIS MAP message including the G-SID along with a request bandwidth allocation for requesting CM bandwidth, with the request bandwidth allocation comprising a bandwidth for allocation requests transmitted by the CM, the IE including the CM bandwidth allocation; and
receive a bandwidth allocation for one or more service flows from the CM.

15. A cable modem (CM), comprising:
a receiver module configured to receive a generic service identifier (G-SID) included in a corresponding information element (IE) in a data over cable service interface specification (DOCSIS) upstream bandwidth allocation MAP message, the G-SID comprising an identifier assigned to the CM, the IE including a CM bandwidth allocation for multiple service flows of the CM in a single entry of the upstream bandwidth allocation MAP message; and a transmitter module coupled to the receiver module, the transmitter module configured to transmit the upstream data for one or more service flows of the CM via at least a portion of the CM bandwidth allocation.

16. A cable modem termination system (CMTS), comprising:
a transmitter module configured to send a data over cable service interface specification (DOCSIS) upstream bandwidth allocation MAP message to a cable modem (CM), with the DOCSIS upstream bandwidth allocation MAP message including a generic service identifier (G-SID) in a corresponding information element (IE), the G-SID comprising an identifier assigned to the CM, the IE including a CM bandwidth allocation for multiple service flows of the CM in a single entry of the upstream bandwidth allocation MAP message; and
a receiver module coupled to the transmitter module, the receiver module configured to receive the upstream data for one or more service flows of the CM via at least a portion of the CM bandwidth allocation.

* * * * *